Jan. 12, 1965     S. LARKIN     3,165,618
ELECTRICAL WELDING APPARATUS
Filed May 4, 1962
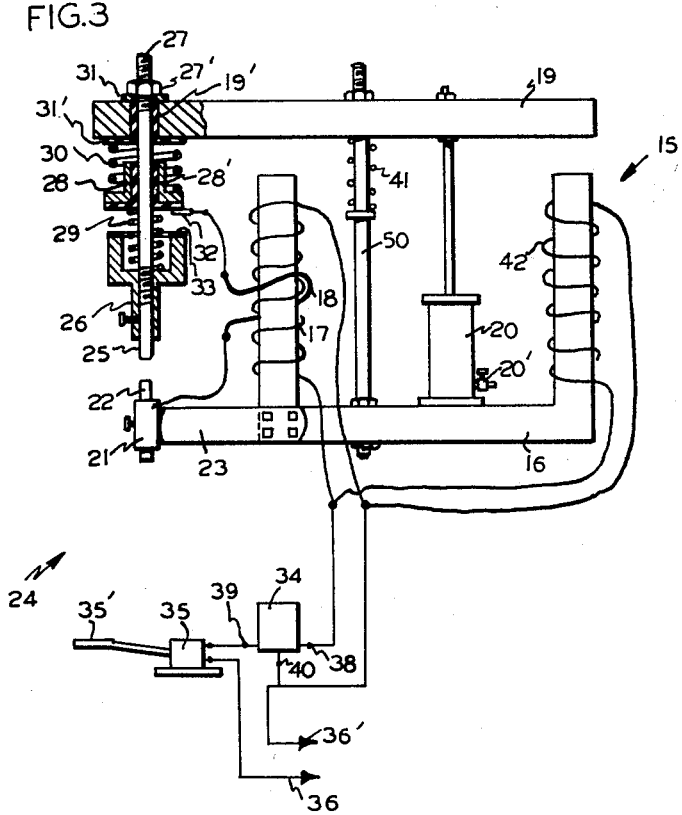
FIG.3
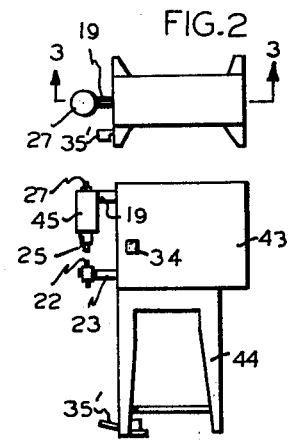
FIG.2
FIG.1
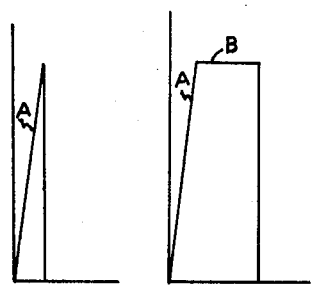
FIG.4    FIG.5
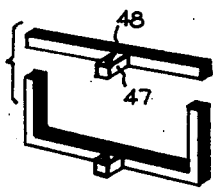
FIG.6
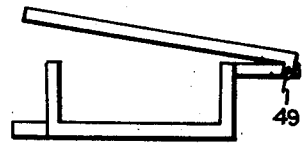
FIG.7
INVENTOR,
SAM LARKIN,
BY
ATTORNEY.

United States Patent Office 3,165,618
Patented Jan. 12, 1965

3,165,618
ELECTRICAL WELDING APPARATUS
Sam Larkin, 254 Beach 140th St., Belle Harbor, N.Y.
Filed May 4, 1962, Ser. No. 192,501
6 Claims. (Cl. 219—86)

The present invention relates to electric resistance welding apparatus. The parts to be welded together are placed in contact with each other, between and in contact with electrodes which are connected to the secondary terminals of a step-down transformer.

Heretofore, in electric welders of this class, the function of the transformer was merely to supply the welding current. Other mechanism was relied on for the relative movement of the electrodes and other incidents of operation. The machine carried the transformer.

The principal object of this invention is to provide a novel and improved welding apparatus of the type mentioned, in which the transformer in addition to its current supplying function, operates to accomplish the required relative movement of the welding electrodes and carries mechanism for automatically bringing the electrodes to bear with proper pressure on the work before and while current is applied to the work. Except for some of the switch means to control the cycle of operation, the transformer and its appurtenances constitute the machine.

Another object thereof is to provide that upon closing a switch to initiate the cycle of operation, then automatically while the transformer builds up to its peak current output, proper pressure is built up upon the work by the electrodes and only then is current fed through the work and allowed therethrough for a selected interval, which may be but an instantaneous "squirt" as would be proper to weld aluminum. For the welding of other materials, such time interval can be adjusted to suit. Means are also provided to control the time for such current and pressure build-ups.

Still a further object of this invention is to provide a novel and improved welding apparatus of the character described, having the mentioned attributes, which is simple in construction, reasonable in cost, easy to understand and manipulate and efficient in carrying out the functions for which it is designed.

Other objects and advantages will become apparent as this disclosure proceeds.

For the practice of this invention, I make the primary coil of the transformer to function also as the coil of a solenoid whose movable armature serves as part of the transformer core and the ram of a press which carries one of the electrodes. The carrier of this electrode may have a bar in extension thereof which is slidably mounted on the armature and has stop means to limit movement of such electrode towards the other electrode which is fixed on the transformer. This bar carries a slidable collar thereon intermediate the armature and the holder for the electrode on such bar. A compression coil spring on said bar, between said electrode holder and collar, hold the latter normally apart. Opposite contacts on said holder and collar constitute a switch means interposed in the secondary circuit. A second, but stronger compression coil spring is about said bar, between said collar and armature to normally hold the latter apart. Various of the parts need be suitably insulated as will be explained. The primary circuit includes a timing switch, and preferably a pedal-operated switch to close the primary circuit. The part of the core which serves as the armature is spring biased to normally be away from the balance of the transformer core and may be associated with for instance a dash-pot means to control armature movement.

In the accompanying drawing forming part of this specification, similar characters of reference indicate corresponding parts in all the views.

FIG. 1 is a side view of a welding apparatus embodying teachings of this invention.

FIG. 2 is a top plan view of FIG. 1.

FIG. 3, drawn to a larger scale, is a side view of the welder mechanism shown partly in section and the electrical circuit which is included in this view for convenience, is shown diagrammatically.

FIGS. 4 and 5 are graphs of the behavior of the welding current in different circumstances of operation which will be explained.

FIG. 6 is an exploded perspective view showing a transformer core construction of modified form which is adaptable for the practice of this invention.

FIG. 7 is a side view of another form of transformer core structure.

In the drawing, the numeral 15 designates generally a closed-core transformer comprised of a U-form core part 16 carrying the primary coil 17 and the secondary winding 18 thereabout a leg thereof and there is a separate bar core part 19 which is spring-biased to be normally away from the distal ends of the core part 16, but which upon the passage of current through said primary coil 17, is attracted to bridge said distal ends. It is evident that said bar 19 serves as the armature of a solenoid which it forms with said primary coil 17. An adjustable dash pot 20 may be included to control the movement of the armature 19 towards the core part 16. A holder 21 for the stationary electrode 22, is on the bracket 23 extending from the stationary core part 16 of the welding apparatus designated generally by the numeral 24.

The electrode 25, transported by the armature 19, is in a holder 26 from which the rod 27 extends. This rod is slidably mounted through the bar core part 19 and its movement towards the electrode 22 is limited by the adjustable stop element 23, which may be a nut on a threaded end portion of said slide rod 27. On said rod, intermediate the electrode holder 26 and the armature 19, there is the collar 28 which is spaced from said holder and armature when the welder is inactive. There is a compression coil spring 29 on said rod 27, between and in contact with said holder 26 and said collar 28 and there is a stronger compression coil spring 30 on said rod 27, between and in contact with said collar and armature 19. Said rod 27 is insulated from said collar for it slides in the bushing 28' lining the collar's interior and in the bushing 19' which lines the hole through the armature; said bushings being of dielectric material. Insulative washers 31, 31' keep the spring 30 and the nut 27' from contacting the armature 19. A contact element 32 which is carried on but insulated from the collar 28, and a contact element 33 directly opposite, in connection with the conductive electrode holder 26, constitute a first switch. One terminal of the secondary winding 18 is connected to the fixed welding electrode holder 21 and its other terminal is connected to said contact element 32. It is evident that when said contact elements which are normally apart, touch, that the electrodes 22 and 25 will apply current from the secondary winding 18 of the transformer to work (not shown) placed in a continuous contact with said electrodes.

An adjustable timer indicated at 34, is a normally open switch including electrically-operated means which when actuated will close such switch to close and remain so for a selected period of time. These timers are well known in the electrical arts and so their structure needs no further explanation. The switch offered by said timer, is connected in series with the primary winding 17 and there is a third switch 35 which may be pedal-operated as indicated at 35', interposed in one of the lines 36, 36' which are the power supply for the primary winding 17. The terminals of the switch offered by said timer 34, are numbered 38, and 39. The terminals of the means to actuate said switch of the timer, are 39 and 40. The switch offered by the timer, normally open, is interposed in one of the power lines. The terminal 38 is connected to the other power line.

To trace the primary circuit as shown in FIG. 3, it is noted that the power line 36 is connected to one terminal of the switch 35 whose other terminal is connected to the terminal 39 of the timer 34. The terminal 38 of said timer is connected to one of the terminals of the primary winding 18. The other terminal 37 of said primary winding and the terminal 40 of the timer, are connected to the power line 36'.

At normal rest condition, the apparatus is as shown in FIG. 3 where all switch means are open. To operate, place the pieces to be welded, one on top of each other, between the welding electrodes 25, 22 and atop the latter. The space between the electrodes should be very little more than is required to admit the work between them, so that upon very little downward movement of the bar core part 19, the work-pieces in contact with each other, will be in contact with both electrodes respectively. Now, press down on the pedal 35' to close the switch 25. This closes the circuit of the operating mechanism of the timer, whose terminals are 39, 40 which in turn closes the switch offered by the timer, whose terminals are 39, 38 and holds such switch closed for a predetermined length of time. Being that all switches interposed in the primary circuit are closed, the current of the power lines 36, 36' will now flow through the transformer's primary winding 17, thereby magnetising the U-part 16 of the core and thereby attracting the core bar part 19 which is caused to move downward to the distal ends of said U-part 16. The winding 17 thus serves not only as the primary of the transformer, but also as a magnet coil to bring the electrodes towards each other.

During such movement of the bar 19, the following happens. The welding electrode 25 very soon contacts the work and the spring 29, being much weaker than the spring 30, will become stressed. This applies the electrode 25 with pressure against the work which pressure is augmented by the action of the compression coil spring 41 which biases the bar part 19 to return to normal rest position upon cessation of current flow through the primary winding 17. As this pressure continues, the contact 33 will touch the contact element 32, thus closing the circuit of the secondary winding 18, and hence current will flow through the work. Upon further movement downward of said core bar part 19 until it finally contacts the distal ends of the U-form core part 16, the bar 19 is afforded freedom downward though the collar 28 is stopped, by the compressibility of the spring 30.

At a prescribed time after the secondary circuit is closed by the contact elements 32 and 33 coming into contact with each other, the timer mechanism will automatically open the switch thereof whose terminals are 38, 39, thus opening the primary circuit whereupon the spring 41 will cause the bar 19 to return to its normal rest position as shown in FIG. 3. The mechanism of the timer 34 is such that the switch 35 need be opened and then closed again for the timer to operate to again close the switch offered across the terminals 38, 39. Of course, upon return of the bar 19 to its normal rest position, the entire apparatus will again be in the condition shown in FIG. 3. So upon release of the pedal 35', new work can be set and the cycle repeated.

The force of attraction for the bar core part 19 can be doubled by having the magnet coil 42 on the second leg of the U-shape core part 16, such coil being connected in parallel with the primary coil 17 and arranged to give proper polarity. Also if desired, a dash pot 20 may be included to control the downward movement of said core part 19 and its exhaust port opening may be adjustable by a valve 20'. The apparatus may be enclosed in a casing 43 on a suitable stand 44 and a shield 45 carried on said bar part 19, may be included to house the mechanism carried on the slidebar 27. The timer 34 may be on the casing 43, to be accessible for time adjustment.

Because of the movement of the bar core part 19 to bridge the distal ends of the U-part 16 of the core, the effectiveness of the magnetic circuit of the transformer is quickly increased, thereby causing a quick-build-up of the current induced in the secondary winding 18 as indicated by the lines "A" of the graphs shown in FIGS. 4 and 5. For the welding of aluminum, the welding current at its highest intensity must be of short duration and within the time that it remains plastic. Hence there must be very quick cut-off very soon after the metal has started to become plastic. In such instance, the current curve would be as shown in FIG. 4. For the welding of other metals, peak current is applied to the work for longer periods as experience shows. So in FIG. 5, the current curve shown includes a period of sustained peak current as exemplified by the line B.

It is to be noted that the dash pot means 20 and the track bar 50 shall be on non-magnetizable material so that they shall not affect the magnetic flux path of the transformer.

Instead of having the mechanism which is housed in the shield 45, at one end of the movable core part 19, for a modified construction, I suggest the arrangement provided in FIG. 6, where such mechanism would be spaced from a face of the U-part of the transformer core and centrally between the legs of such U-part, by having the arm 47 to extend horizontally from the movable bar core part with the hole 48 for the bearing for the slide rod 27. In all other respects, the construction would be as shown in FIG. 3. As a further embodiment which copies the arrangement shown in FIG. 3, the movable bar core part of the transformer may be pivotally mounted as indicated in FIG. 7, at 49.

The incidents of control offered by the mechanism housed in the shield 45, may be had in any welding apparatus, by having such mechanism carried by the movable arm thereof; such movable arm or ram being the one which heretofore carried the movable electrode. Hence, existing welders of the resistance type can be fitted to include such mechanism, to gain that the secondary circuit will close after the electrodes bear with proper pressure on the work.

This invention is capable of numerous forms and various applications without departing from the essential features herein disclosed. It is therefore intended and desired that the embodiments shown herein be deemed merely illustrative and not restrictive and that the patent shall cover all patentable novelty herein set forth; reference being had to the following claims rather than to the specific description herein to indicate the scope of this invention.

I claim:

1. In an electrical resistance type welding apparatus, the combination of a step-down transformer having a primary winding and a secondary winding on a transformer core of substantially U-form; said primary winding being on one leg of said U-form, a magnet coil on the second leg of said U-form; said magnet coil and primary winding being connected so that when current passes through one of them, current will also pass through the other; said core being magnetized upon the passage of a current through said magnet coil and primary winding, a movably mounted magnetizable member positioned opposite both distal ends of said U-form, biased to be normally away from said core and adapted upon the actuation of said primary winding and magnet coil to be attracted to and contact both of said core ends thereby making the transformer core of the closed type while said movable member makes contact with said core ends, a first welding electrode holder at a position to be approached by said movable member when the latter moves towards said core end, a second welding electrode holder carried on said movable member, two welding electrodes, one mounted in each of said holders respectively; said electrodes being opposite each other so that upon movement of said movable member towards said core ends, the second electrode will approach the first electrode for pressing action against work pieces between them; said electrode holders being insulated from each other and means connecting the terminals of the secondary winding to said holders respectively, at least after the movable member has moved a predetermined distance in the direction towards said core ends.

2. In an electrical resistance type welding apparatus, the combination of a step-down transformer having a primary winding and a secondary winding on a transformer core of substantially U-form; said primary winding being on one leg of said U-form, a magnet coil on the second leg of said U-form; said magnet coil and primary winding being connected so that when current passes through one of them, current will also pass through the other; said core becoming magnetized upon the passage of a current through said magnet coil and primary winding, a movably mounted magnetizable member positioned opposite both distal ends of said U-form, biased to be normally away from said core and adapted upon the actuation of said primary winding and magnet coil to be attracted to and contact both of said core ends thereby making the transformer core of the closed type while said movable member makes contact with said core ends, a first welding electrode holder at a position to be approached by said movable member when the latter moves towards said core ends, a second welding electrode holder fixed on a rod which is slidably mounted on said movable member, for longitudinal movement towards and away from the first electrode holder, a contact element insulatively carried by said rod, normally spaced from said second electrode holder, spring means carried on said movable member, biasing said second electrode holder towards the first electrode holder, a normally open switch means operated to close by said spring means when the latter is stressed beyond a predetermined amount; said switch means being interposed in the connection from the secondary winding to the second electrode holder; said contact element being adapted to contact said second electrode holder when the spring means is stressed as mentioned; said contact element and the second electrode holder constituting said switch means; said contact element being on a slidable collar positioned on said rod between said movable member and the second electrode holder; said spring means constituting two compression springs on said rod; the first spring being between and in contact with said movable member and said collar and the second of said springs being between and in contact with said collar and the second electrode holder; said first spring being substantially stronger than the second spring, two welding electrodes, one mounted in each of said holders respectively; said electrodes being opposite each other so that upon movement of said movable member towards said core ends, the second electrode will approach the first electrode for pressing action against work pieces between them; said electrode holders being insulated from each other and means connecting the terminals of the secondary winding to said holders respectively, at least after the movable member has moved a predetermined distance in the direction towards said core ends.

3. A welding apparatus as defined in claim 2, including means to adjustably control the movement of said movable member towards the mentioned ends of the core.

4. A welding apparatus as defined in claim 2, wherein said movable member has a lateral extension at mid section for supporting the mentioned rod which carries the second electrode holder; the U-shaped core having a lateral extension for supporting the first electrode holder; said extensions being opposite each other.

5. A welding apparatus as defined in claim 1, including a means to adjustably control the movement of said movable member towards the mentioned end of the core.

6. A welding apparatus as defined in claim 1, wherein said movable member has a lateral extension at mid section for supporting the second electrode holder; the U-shaped core having a lateral extension for supporting the first electrode holder; said extensions being opposite each other.

References Cited by the Examiner
UNITED STATES PATENTS

| | | | |
|---|---|---|---|
| 1,078,675 | 11/13 | Heany | 219—86 |
| 1,620,206 | 3/27 | Hoffer | 219—108 |
| 2,063,257 | 12/36 | Martin | 219—89 |
| 2,294,388 | 9/42 | Dawson. | |
| 2,473,772 | 6/49 | Vang | 219—86 |

FOREIGN PATENTS

| | | |
|---|---|---|
| 336,825 | 3/22 | Germany. |
| 371,066 | 3/23 | Germany. |

RICHARD M. WOOD, *Primary Examiner.*